US012722276B2

(12) United States Patent
Schafer

(10) Patent No.: US 12,722,276 B2
(45) Date of Patent: Sep. 1, 2026

(54) CONSTRUCTION MATERIAL MARKING DEVICE FOR FASTENER PLACEMENTS

(71) Applicant: Leighton Schafer, Chino Valley, AZ (US)

(72) Inventor: Leighton Schafer, Chino Valley, AZ (US)

(73) Assignee: SCHAFER GLOBAL INNOVATIONS, LLC, Chino Valley, AZ (US)

( * ) Notice: Subject to any disclaimer, the term of this patent is extended or adjusted under 35 U.S.C. 154(b) by 0 days.

(21) Appl. No.: 19/138,730

(22) PCT Filed: Dec. 6, 2023

(86) PCT No.: PCT/US2023/082643

§ 371 (c)(1),
(2) Date: Jun. 13, 2025

(87) PCT Pub. No.: WO2024/129453

PCT Pub. Date: Jun. 20, 2024

(65) Prior Publication Data

US 2026/0008173 A1 Jan. 8, 2026

Related U.S. Application Data

(60) Provisional application No. 63/486,337, filed on Feb. 22, 2023, provisional application No. 63/387,409, filed on Dec. 14, 2022.

(51) Int. Cl.
*B25H 7/04* (2006.01)

(52) U.S. Cl.
CPC .................................... *B25H 7/04* (2013.01)

(58) Field of Classification Search
None
See application file for complete search history.

(56) References Cited

U.S. PATENT DOCUMENTS 2,660,791 A * 12/1953 Howell ................ E01C 23/163 33/41.6
3,063,370 A * 11/1962 Eberhardt .......... E04G 21/1891 33/36

(Continued)

FOREIGN PATENT DOCUMENTS

AU 2017210649 B2 8/2017
CN 206475167 U 9/2017

(Continued)

OTHER PUBLICATIONS

Northline Express, Youtube Video showing the operation of a "mingo marker": <https://www.youtube.com/watch?v=em0MIXn0Haw> Retrieved May 15, 2026 (Year: 2011).*

(Continued)

*Primary Examiner* — Jacob J Cigna
(74) *Attorney, Agent, or Firm* — Coughlin Law Office; Stuart M. Aller; Daniel J. Coughlin

(57) ABSTRACT

A construction material marking device includes an edge rail. A marking arm extends laterally from the edge rail. A marker mount is disposed upon the marking arm for mounting a marker, such as an aerosol paint container. A mark discharge assembly is mechanically connected to the roller. Rotation of the roller causes the mark discharge assembly to activate the marker at periodic intervals during rotation of the roller. Activation of the marker may propel an aerosol spray through an aperture of the marking arm for placement of marks at predetermined intervals on a construction material. Marks may correspond to fastener positions that are offset from the construction material's edge and longitudinally spaced apart at an interval corresponding to a building code.

16 Claims, 10 Drawing Sheets

(56) References Cited

U.S. PATENT DOCUMENTS

| | | | | | |
|---|---|---|---|---|---|
| 3,796,353 | A | | 3/1974 | Smrt | |
| 3,885,315 | A | | 5/1975 | Polselli et al. | |
| 3,896,725 | A | * | 7/1975 | Grover | B41F 17/10 101/376 |
| 3,988,835 | A | * | 11/1976 | Thornton | B25H 7/04 33/36 |
| 4,372,049 | A | * | 2/1983 | Hogue | B43K 8/00 101/328 |
| 4,794,857 | A | * | 1/1989 | Waters, Sr. | B41K 1/22 101/328 |
| 4,903,409 | A | | 2/1990 | Kaplan et al. | |
| 4,989,342 | A | * | 2/1991 | Nosek | G01C 22/00 33/780 |
| 5,103,566 | A | | 4/1992 | Stebe | |
| 5,195,247 | A | * | 3/1993 | Wilcox | E04G 21/1891 33/36 |
| 6,102,305 | A | | 8/2000 | Chapman et al. | |
| 6,467,174 | B1 | | 10/2002 | Kotori | |
| 6,698,774 | B2 | * | 3/2004 | Duncan | E01C 23/163 280/79.6 |
| 7,051,444 | B1 | | 5/2006 | Hofer | |
| 7,818,888 | B2 | * | 10/2010 | Bahler | B25H 7/00 33/518 |
| 8,424,486 | B2 | | 4/2013 | Nielsen et al. | |
| 8,898,945 | B2 | | 12/2014 | Miller | |
| 11,059,659 | B2 | | 7/2021 | Ghavami-Nasr et al. | |
| 11,261,571 | B2 | | 3/2022 | Dolinar et al. | |
| 12,263,572 | B1 | * | 4/2025 | Conklin | B25H 7/04 |
| 2002/0175221 | A1 | * | 11/2002 | Roman | E01C 23/227 239/150 |
| 2009/0064527 | A1 | * | 3/2009 | Weavers | G01B 3/12 33/775 |
| 2009/0217542 | A1 | * | 9/2009 | Watkins | B65D 83/386 33/775 |
| 2011/0180626 | A1 | | 7/2011 | Kang | |
| 2018/0335289 | A1 | | 11/2018 | Webb | |
| 2019/0162514 | A1 | * | 5/2019 | LeMieux | B25H 7/04 |

FOREIGN PATENT DOCUMENTS

| | | | | | |
|---|---|---|---|---|---|
| CN | 109551014 | A | | 4/2019 | |
| CN | 112157639 | A | | 1/2021 | |
| DE | 10307183 | A1 | * | 9/2004 | E01C 23/163 |
| GB | 1185529 | A | * | 3/1970 | B65D 83/267 |
| JP | 11207664 | A | | 8/1999 | |

OTHER PUBLICATIONS

Schafer, Leighton. Private video showing the inventive device. (Year: 2023).*

Liu Yufeng et al., Scribing device for building construction, this is a machine translation of a foreign patent orginally published as CN112157639A on Jan. 1, 2021, 23 pages, Espacenet, China National Intellectual Property Administration, China.

Igarashi Toru et al., Marking Device, this is a machine translation of a foreign patent originally published as JPH11207664A on Aug. 3, 1999, 15 pages, Espacenet, Japan Patent Office, Japan.

Bailey's Inc., Mingo Marker Complete With All Wheels, published as early as Feb. 13, 2023, 2 pages, https://www.baileysonline.com/mingo-marker-complete-with-all-wheels.html.

Kapro, 317 Adjustable Drywall T-Square Tool, Tools With Vision, as early as Jan. 31, 2023, 5 pages, Kapro Tools, Amazon, Lake Mills, WI.

Taina Matos, Written Opinion of the International Searching Authority, Feb. 16, 2024, 9 pages, International Searching Authority/United States, Alexandria, VA.

Zhejiang Industry Polytechnic College, A kind of building site foundation stone ashes chalker, this is a machine translation of a foreign patent originally published as CN206475167U on Sep. 8, 2017, 4 pages, Google Patents, China National Intellectual Property Administration, China.

Suqian Zhi Zhi Intelligent Technology Co Ltd, A kind of round tube gauge length dotting machine based on conical disc control, this is a machine translation of a foreign patent originally published as CN109551014A on Apr. 2, 2019, 4 pages, Google Patents, China National Intellectual Property Administration, China.

* cited by examiner

CONSTRUCTION MATERIAL MARKING DEVICE FOR FASTENER PLACEMENTS

CROSS REFERENCES

This application is an international application which claims the benefit of U.S. Provisional Application No. 63/387,409, entitled "Construction Code Marking Device and Method of Marking Construction Sheathing for Fastener Placement," filed on 14 Dec. 2022, and U.S. Provisional Application No. 63/486,337, entitled "Construction Code Marking Device and Method of Marking Construction Sheathing for Fastener Placement," filed on 22 Feb. 2023, both of which are incorporated herein by reference in their entirety.

TECHNICAL FIELD

The present disclosure relates to an automatic marking device mounted with a compressible aerosol spray container and, more particularly, to a marking device that activates the marker periodically by reciprocating motion of a mechanical actuator to control placement of visual indica at predetermined, measured intervals in an interrupted marking line that is laterally offset and parallel with an edge rail of the marking device riding an edge of the material as the marking device wheels over a surface of the material.

BACKGROUND

This disclosure relates to marking devices for line marking on surfaces. A marking device may be used for dispensing a marking substance such as paint. Spray paint aerosol cans may be disposed in various holders which enable users to operate the aerosol can to spray a mark while walking or standing erect. Marking fluid can be sprayed onto the surface as the marking device is wheeled across the surface. Marking fluid may come from an aerosol dispenser, such as inverted marking spray paint (also known as "upside down paint').

A marking paint may be utilized for identifying a particular boundary or line demarcation. For example, in construction such markings may be used to indicate proper placement of construction elements such as fasteners, studs, rebar, attachment points, and other similar structural members. In public works, such markings may indicate traffic or parking boundaries.

SUMMARY

This disclosure relates to a marking device that includes: (a) an edge rail that extends longitudinally; (b) a marking arm that extends laterally from the edge rail; (c) a marker mount disposed upon the marking arm; (d) a roller mounted to the platform or marking arm, wherein the roller rotates about an axis perpendicular to the edge rail; (e) a mark discharge assembly mechanically connected to the roller and mounted to the platform or marking arm, wherein the mark discharge assembly activates a marker mounted upon the marker mount in response to rotation of the roller.

In some aspects, the disclosure below relates to a marking device, where a length of the marking arm is adjustable to change a first offset distance between the marker mount and the edge rail.

In some aspects, the disclosure below relates to a marking device, where the first offset distance is adjustable between 12 inches to 24 inches (approximately 30 centimeters (cm) to 60 cm).

In some aspects, the disclosure below relates to a marking device, where the roller is a wheel having a circumference between 2 inches to 12 inches (approx. 5 cm to 30 cm).

In some aspects, the disclosure below relates to a marking device, where the mark discharge assembly includes: (a) a slider-crank linkage including: (i) a connecting rod connected to the roller; (ii) a trigger arm disposed distal to the connecting rod, where the trigger arm is operable to move from a first limit position to engage the marker and disengage the marker.

In some aspects, the disclosure below relates to a marking device, where the roller is a wheel having a circumference between 2 inches to 12 inches (approx. 5 cm to 30 cm) and the marker is engaged for approximately 1 inch of the circumference during rotation of the roller and disengaged over the remaining circumference of the roller.

In some aspects, the disclosure below relates to a marking device, where the mark discharge assembly activates the marker upon rotation of the roller.

In some aspects, the disclosure below relates to a marking device, wherein the marker directs the plurality of marks downwardly through an aperture in the platform.

In some aspects, the disclosure below relates to a method of marking material relative to an edge of the material; (a) moving the marking device along the edge of the material; (b) placing a plurality of marks at predetermined intervals upon a surface of the material that extends perpendicular to a plane defined by the edge of the material, where the plurality of marks extend in a line parallel with the edge.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

Aspects are illustrated by way of example, and not by way of limitation, in the accompanying drawings, wherein.

DETAILED DESCRIPTION

Figure 1:
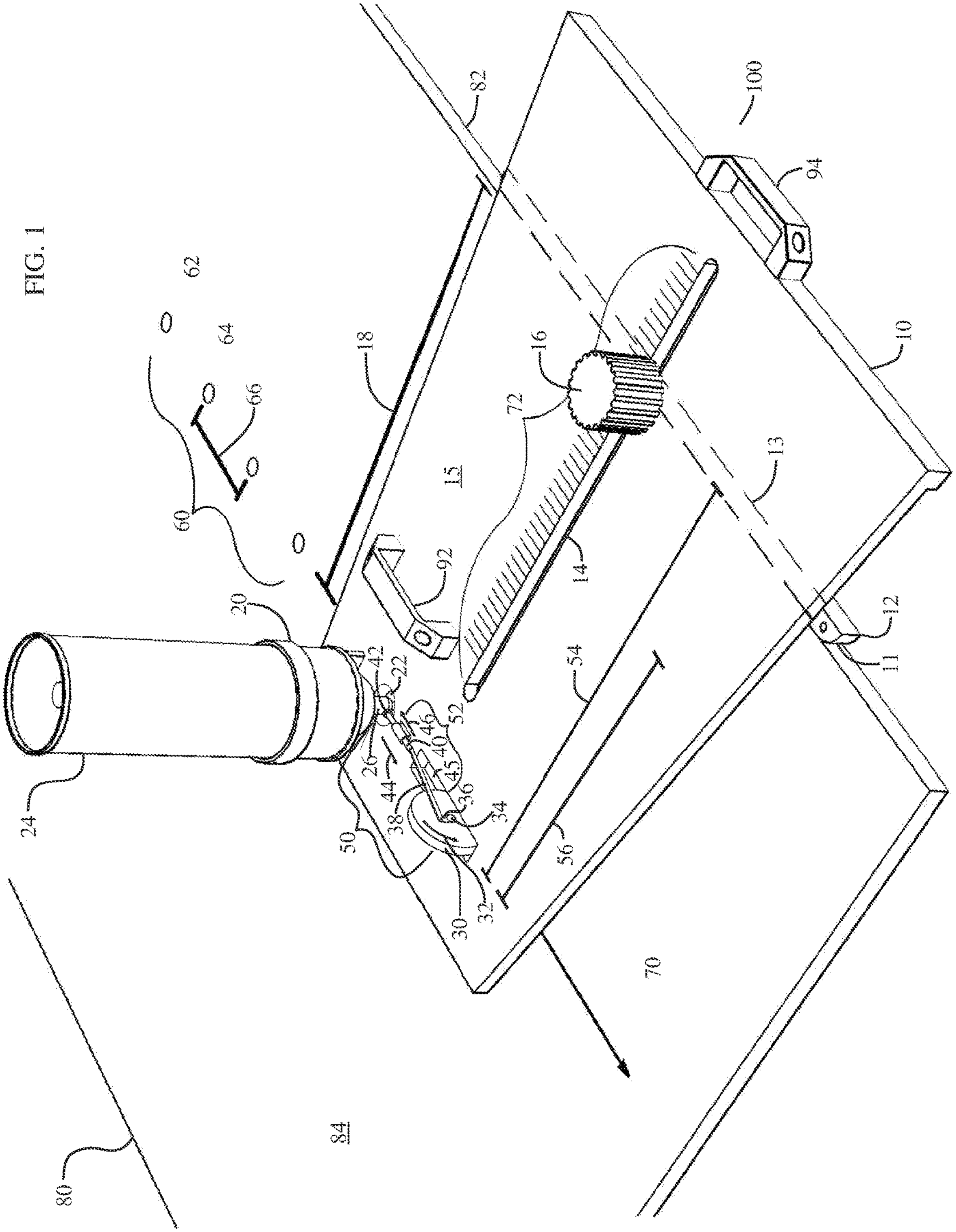
FIG. 1 is a top perspective view depicting an example of a marking device having an edge rail, marking arm, and a mark discharge assembly.

A marking device 100 and a plurality of marks 60 on a top surface 84 of a material 80 are shown in FIG. 1. Each of the plurality of marks 60 is placed at an interval 66 by actuation of a mark discharge assembly 50 mechanically connected to a roller 30 mounted to the marking device 100. The plurality of marks 60 are formed in a marking line that is offset and parallel with an edge 82 of the material 80. The interval 66 between a first mark 62 and a second mark 64 is based on dimensions of the structural components of the mark discharge assembly 50.

The marking device 100 may comprise the following structural components: (a) an edge rail 12 that extends longitudinally; (b) a platform 10 including: (i) a marking arm 18 that extends laterally from the edge rail 12; (c) a marker mount 20 disposed upon the marking arm 18; (d) a roller 30 mounted to the platform 10 or marking arm 18, where the roller 30 has rotational motion (see movement arrow 32) about an axis 34 perpendicular to the edge rail 12; (e) a mark discharge assembly 50 is mechanically connected to the roller 30 and mounted to the platform 10 or marking arm 18, where the mark discharge assembly 50 activates a marker 24 mounted upon the marker mount 20 in response to rotational motion (movement arrow 32) of the roller 30. The marker 24 is activated at periodic intervals by the mark discharge assembly 50.

Interrupted marks formed in the marking line are offset and parallel with a longitudinal axis of the edge rail 12. The mark discharge assembly 50 is mounted to the marking arm 18 at a lateral offset from the edge rail 12. The interrupted marks are produced as the marking device 100 rides an edge of the material to be marked. The marking device 100 may ride the edge of the material whether horizontal, vertical, or an angle in between horizontal and vertical. In the case where the marking device is utilized in construction, the interrupted marks define a code orientation line for aligning fastener placement to correspond with centerlines of wall or roof studs.

As shown in FIG. 1, a first offset distance 54 establishes the lateral offset of a marking line for the interrupted marks. A marking arm 18 of the marking device 100 may be adjustable to change the first offset distance 54 between the marker mount 20 and the edge rail 12. Alternatively, edge rail 12 may be adjustable along the marking arm 18. In effect, adjustment of the edge rail 12 along a lateral span of the marking device 100 changes the functional length of the marking arm 18 relative to the edge 82 of the material 80. Measurement markings 72 for the first offset distance 54 and a second offset distance 56 may run down a lateral edge of marking arm 18, where the lateral edge is perpendicular to the edge rail 12. The measurement markings 72 may be placed at regular intervals along marking arm 18 to assist an operator in positioning the edge rail 12 at the offset distance selected. The measurement markings 72 may be etched or printed on marking arm 18 for operator-visibility.

FIG. 1 shows marking device 100 having measurement markings 72 that are laterally spaced apart along a lateral slot 14 disposed through platform 10. The measurement markings 72 indicate an offset distance that may be selected. As shown, the measurement markings 72 are equally spaced. In the case of marking for construction codes, the measurement markings 72 may correspond to standard distances between wall stud spacings. An operator 4 may follow measurement markings 72 to establish the first offset distance 54 for one job site and quickly and easily establish the second offset distance 54 for a second job site. Different regional authorities may require different fastener spacings. Therefore, the measurement markings 72 may be tailored to different construction regions.

As shown in FIG. 1, sliding head 16 may be fastened to the edge rail 12 through the lateral slot 14. The edge rail 12 beneath the platform 10 is shown by the overlying dashed lines 13. The sliding head 16 may be a threaded knob. Although a singular sliding head 16 is shown for simplicity's sake, multiple sliding heads 16 may be employed to maintain the orientation of the marking arm 18 relative to the edge rail 12. The sliding head 16 may be secured to the edge rail 12 by tightening of the threaded knob. The sliding head 16 may be tightened at a measurement marking indicating 24 inches (approx. 60 cm) at the first offset distance 54. The sliding head 16 may be released from the edge rail 12 by loosening the threaded knob. Loosening of the sliding head 16 permits lateral movement of the edge rail 12 to increase or decrease the distance between the marker mount 20 and the edge rail 12. The 18 sliding head 16 positioned at the first offset distance 54 along the lateral slot 14 disposed through platform 10 may be slid to the second offset distance 56. As a result, the edge rail 12 may be moved towards the marker mount 20 from the first offset distance 54 to the second offset distance 56. The sliding head 16 may be tightened at a measurement marking indicating 16 inches (approx. 40 cm) at the second offset distance 56. The sliding head 16 may be returned from the second offset distance 56 to the first offset distance 54 along the lateral slot 14. As a result, the edge rail 12 may be moved away from marker mount 20 from the second offset distance 56 to the first offset distance 54. The sliding head 16 may be tightened at the measurement marking indicating 24 inches (approx. 60 cm).

As shown in FIG. 1, the lateral slot 14 spans a longitudinal length of the marking arm 18. The lateral slot 14 is perpendicular to a longitudinal axis of the edge rail 12 shown, in phantom, by the overlying dashed lines 13. Grooves, dados, or other channels matched to corresponding tongues or protrusions on the edge rail 12, or vice versa, may retain the edge rail in perpendicular alignment with the lateral slot 14. Alternatively, a plurality of lateral slots and sliding heads may run the lateral span of the marking device 100. This may retain the edge rail 12 in perpendicular alignment to the lateral slots without corresponding tongue and groove guides.

The first offset distance 54 formed by the edge rail being tightened and secured against platform 10 may be set at between 4 inches to 38 inches (approx. 10 cm to 100 cm). The first offset distance 54 may be set further between 8 inches to 22 inches (approx. 20 cm to 55 cm), between 12 inches to 20 inches (approx. 30 cm to 50 cm), between 14 inches to 18 inches (approx. 35 cm to 45 cm), between 14.5 inches to 17.5 inches (approx. 36 cm to 44 cm), between 15 inches to 17 inches (approx. 38 cm to 43 cm), between 12 inches to 24 inches (approx. 30 cm to 60 cm), between 22 inches to 26 inches (approx. 56 cm to 66 cm), between 22.5 inches to 25.5 inches (approx. 57 cm to 65 cm), between 23 inches to 25 inches (approx. 58.4 cm to 63.5 cm), or between 16 inches to 24 inches (approx. 40 cm to 60 cm). The first offset distance may be 12 inches (approx. 30 cm), 16 inches (approx. 40 cm) or 24 inches (approx. 60 cm).

The first offset distance 54 may be set at a spacing that meets building code standards, such as a standard spacing between wall studs, rafters, or beams of a building. Nails, screws, or other fasteners may be placed into construction material at an offset from the edge of the construction material. Construction material may include different types of construction materials, such as plywood sheathing and/or drywall, The first offset distance 54 may be set at 16 inches (approx. 40 cm) so interrupted marks are placed at 16-inch offsets. 16-inch offsets may assist the operator in securing construction material with fasteners against a plurality of wall studs or roof rafters that are spaced 16 inches (approx. 40 cm) apart. The marking arm 18 may be adjusted to set the first offset distance 54, which may be at 24 inches (approx. 60 cm) to match wall studs or roof rafters that are spaced 24 inches (approx. 60 cm) apart. The marking arm 18 may be adjustable, telescopically or with sliding adjustment, between the first offset distance 54 and the second offset distance 56. Offset distances May include distance ranges as set forth above.

The mark discharge assembly 50 of the marking device 100 may have the following components: (a) a slider-crank linkage 52 comprising of: (i) a connector rod 38 connected to the roller 30; (ii) a trigger arm 40 disposed distal to the connector rod 38, wherein the trigger arm 40 is operable to move forward past a first limit position 48 (see movement arrow 46 of FIG. 2) that engages the marker 24 and move backwards past the first limit position 48 (see movement arrow 44 of FIG. 2) that disengages the marker 24. The mark discharge assembly 50 activates the marker 24 upon rotation of the roller 30. It may be possible for the mark discharge assembly to be mechanically, electrically, or hydraulically operated by a device other than a roller. The device, other than a roller, that operates the mark discharge assembly may include a pulley, gearbox, toothed rubber track, or timing belt.

As shown in FIG. 1, the roller 30 is a wheeled disc having a circumference between 2 inches to 12 inches (approx. 5 cm to 30 cm). Alternatively, the roller may be a sphere, cylinder, disc, or oval-shaped roller. The roller 30 may be constructed of any lightweight durable material such as but not limited to: wood, aluminum, plastic, rubber, fiberglass, or similar 4 lightweight durable material. The circumference of the roller 30 may be further between 4 inches to 12 inches (approx. 10 cm to 30 cm), between 6 inches to 12 inches (approx. 15 cm to 30 cm), between 4 inches to 8 inches (approx. 10 cm to 20 cm), between 4.5 inches to 7.5 inches (approx. 11 cm to 19 cm), between 5 inches to 7 inches (approx. 12 cm to 18 cm), 8 between 5.125 inches to 6.875 inches (approx. 13 cm to 17 cm), between 2 inches to 6 inches (approx. 5 cm to 15 cm), between 2.5 inches to 5.5 inches (approx. 6 cm to 14 cm), and between 3 inches to 5 inches (approx. 7.5 cm to 12.5 cm), or between 3.125 inches to 4.875 inches (approx. 8 cm to 12 cm) in circumference. The roller 30 may be 6 inches in circumference (approx. 15.2 cm).

The circumference of the roller 30 and position of the connector rod 38 in relation to the roller 30 may be based on making marks at a predetermined interval 66 to meet code spacing standards. In other words, each of the plurality of marks 60 may be positioned at fixed intervals that correspond to a predetermined measurement. The plurality of marks 60 are spaced apart relative to fixed intervals having uniform gaps to guide placement of fasteners into construction material. Placement of fasteners at fixed intervals based on a predetermined measurement avoids under fastening or excessive fastening. Therefore, meeting applicable building codes for fastener placement into construction material can be met more efficiently.

The roller 30 may be rotatably coupled to and carried by the platform 10. The roller 30 may be detachably coupled to the platform 10 or marking arm 18 so rollers of varying circumferences might be utilized to affect the length of the predetermined interval 66. The roller depth may be adjustable based on axle mount placement relative to platform 10 or marking arm 18. Alteration of the roller depth may affect the distance between a dispense end of the marker 24 and the surface of the material 80. Changing the depth of the roller 30 may impact the size of the mark applied. The roller 30 may be disposed through a slotted aperture 45 in the platform 10 or marking arm 18 to directly contact the surface of the material 80. Preferably, the roller 30 is mounted to an axle mount on the platform 10 or marking arm 18 so that the rotational plane of the roller 30 is aligned with the longitudinal path (see movement arrow 70) of the marking device 100.

As shown in FIG. 1, the roller 30 is offset to one side of marking arm 18. Such offset configuration allows the marking device 100 to move stably and evenly over the top surface 84 of the material 80 when there is guiding contact between the edge rail 12 and the edge 82 of the material 80. Marking device 100 may also move stably and evenly an underside of the material 80 for placement of marks on a bottom surface of the material 80. The edge rail 12 may be manufactured from a low-friction material such as ultra-high molecular weight polyethylene (UHMW). The low-friction material may provide a smooth face 11 for gliding the edge rail 12 against an edge 82 of the material 80. The edge rail 12 may comprise one or more rollers to facilitate smooth and stable movement along the edge 82 of the material 80. The marking arm 18 may comprise one or more rollers to facilitate smooth and stable movement along the top surface 84 of the material 80. The roller 30 may be offset to one side of a slider-crank linkage 52 to prevent contact between the roller 30 and the fresh wet markings dispensed from the marker 24. The roller 30 may be disposed downstream of the marker mount 20 to prevent contact between the roller and the fresh wet markings dispensed from marker 24.

Figure 2:
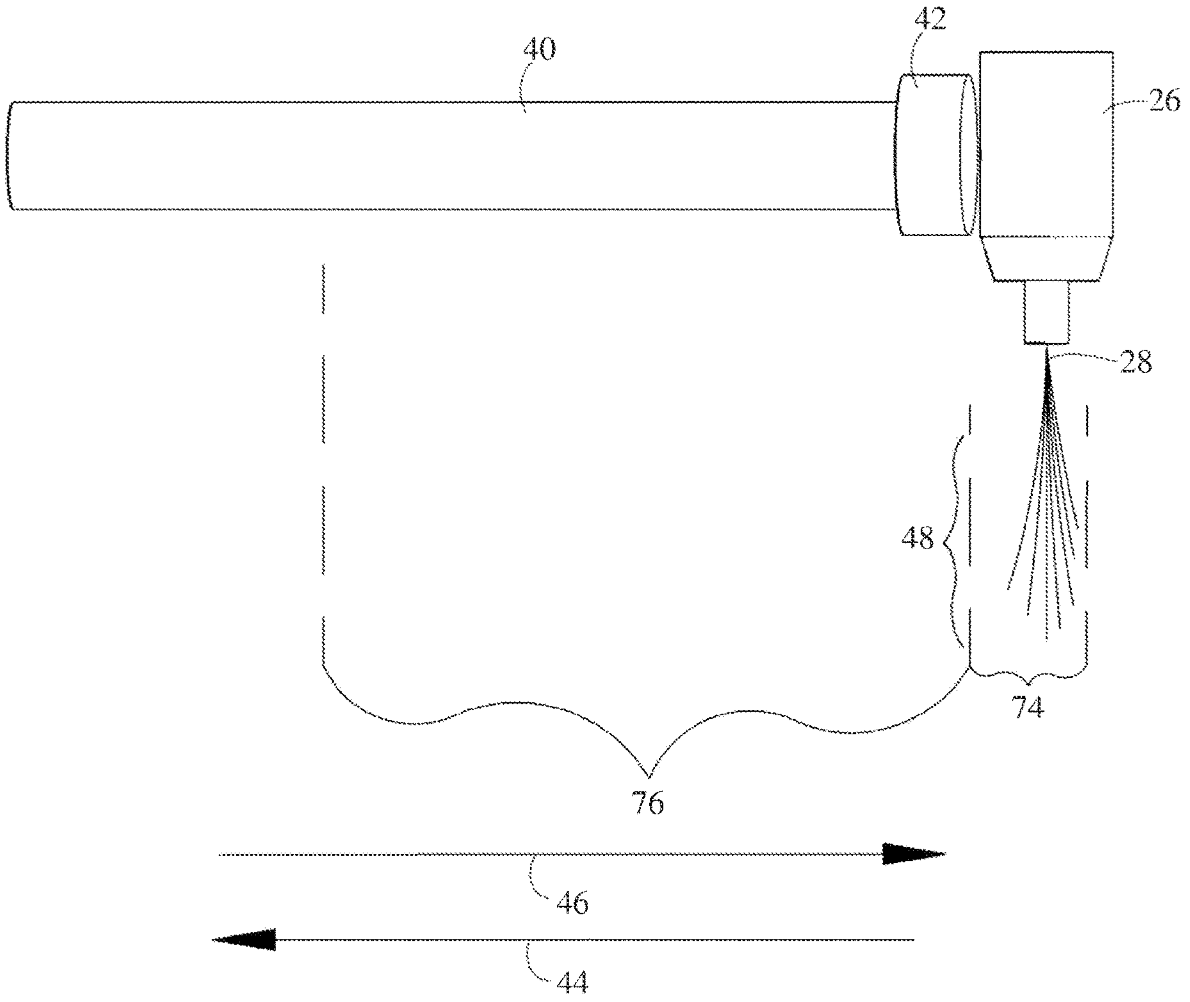
FIG. 2 is a side view depicting a trigger arm in contact with a marking activator of a marker past a first limit position.

The slider-crank linkage 52 of the mark discharge assembly 50 may be connected to the roller 30 and positioned between the roller 30 and the marker mount 20. In the example of the marking device 100 shown in FIG. 1, the slider-crank linkage 52 reciprocates forward (see movement arrow 46) and backwards past (see movement arrow 44) the first limit position 48 as the roller 30 undergoes rotational motion (see movement arrow 32). The reciprocating motion of the trigger arm 40 on the slider-crank linkage 52 works to engage and disengage the marker 24 mounted within the marker mount 20. As shown in FIG. 2, engagement of the marker may occur over a contact range 74 where the trigger hand 42 of the trigger arm 40 is in contact with the marker activator 26 of the marker 24. Disengagement of the marker may occur over a non-contact range 76 where the trigger hand 42 of the trigger arm 40 is not in contact with the marker activator 26 of the marker 24. The amount of time the marker activator 26 is in engagement or disengagement may depend on the range of the trigger arm 40 relative to the first limit position 48. A channel, dado, furrow, or other groove may be disposed in the marking arm 18 directly below the slider-crank linkage 52. The groove may extend along the longitudinal length of the slider-crank linkage 52 to facilitate smooth and stable movement of the slider-crank linkage 52 along the top surface 15 of the platform 10. The groove may be lined with a low-friction material such as UHMW for the reasons discussed above. The trigger arm 40 may be pivotally connected to the connector rod 38. The connector rod 38 may be connected directly to a point along one of the radii of the roller 30 or secured to a cam member 36 fixed to the axis 34 of the roller 30.

Alternatively, a cam device, spring-loaded actuator, cylindrical actuator, or a camshaft may serve in place of the slider-crank linkage 52. In one example, a camshaft may be disposed through the axle of the roller 30 for rotational motion (movement arrow 32) about the axis 34. A pointed cam of the camshaft may rotate about an axis that is perpendicular to a longitudinal path (see movement arrow 70) of the marking device 100 when sliding along an edge 82 of the material 80. Conversion of rotational motion (movement arrow 32) of the roller 30 to reciprocating motion by the point of the cam serves to replace the trigger hand 42 as the activation contact point for the marker activator 26. Note that the distal end of the trigger arm 40 may serve as the trigger hand 42.

The marker activator 26 of the marker 24 may be activated by the trigger arm 40 or a pointed cam of the shaft. As shown in FIG. 1, the trigger arm 40 is configured to activate the marker 24. Activation of the marker 24 causes colorant contents within the marker 24 to be dispensed onto the top surface 84 of the material 80. A trigger hand 42 may be positioned at a distal end of the trigger arm 40 to engage the marker activator 26 of the marker 24. The marker activator 26 may be aligned with a longitudinal length of the slider-crank linkage 52. The trigger hand 42 may activate the marker activator 26 by direct contact. Marker activator 26 is triggered to displace from a disengagement position to an engagement position such that the trigger hand 42 connects with the marker activator 26. In the case where the marker 24 is an aerosol paint container, activation of the engagement position causes a spring-biased valve in the valve stem of aerosol paint container to open to dispense the marking substance from the aerosol paint container.

The marker 24 directs the plurality of marks 60 downwardly through an aperture 22 in the marking arm 18 onto the top surface 84 of the material 80 at evenly, spaced intervals. In another example, the plurality of marks 60 may be placed at intervals having different distributions. A plurality of slider-crank linkages or camshafts may activate the marker at separate intervals to distribute marks at different spacings. Upon activation, the marker 24 will dispense a first mark 62 onto the top surface 84 of the material. As the marking device 100 is pushed or pulled across the top surface 84 of the material a second mark 64 will be placed at a predetermined interval 66 relative to the first mark 62. The marking device 100 may be pushed or pulled by way of a handle, block, slot, or similar handhold attached to the platform 10 and/or the marking arm 18. A latch mechanism may be provided and utilized to secure the handle to the platform 10 of the marking device 100. As shown in FIG. 1, a first handle 92 is fastened to the marking arm 18 and a second handle is fastened to the edge of the platform 10.

As the operator guides the marking device 100 along the top surface 84 of the material 80 in direction of the longitudinal path (movement arrow 70), the roller 30 rotates causing slider-crank linkage 52 to reciprocate back and forth. This reciprocating motion continues to cause the marking substance to dispense from the marker 24 thereby creating an interrupted marking line on the top surface 84 of the material 80. Additional marks are created on the top surface 84 of the material 80 as the trigger hand 42 contacts the marker activator 26 as roller 30 rotates and the trigger hand 42 moves forward (see movement arrow 46) past the first limit position 48. The operator may continue to make any number of marks on any surface of the material 80 by guiding the marking device 100 along an edge 82 of the material 80.

In the case where a construction contractor operates the marking device 100 on construction material, fasteners may be placed and inserted at marks formed, thereby complying with building code requirements. For example, the interval 66 may span 6 inches (approx. 15 cm). The length of the connector rod 38, the circumference of the roller 30, or a trigger arm 40 may be sized to achieve the interval 66.

The roller 30 measures the surface and actuates the marker based on that measurement. The marker activator 26 may be activated within a plane laterally offset and parallel with the rotational plane of the roller 30. The circumference of the roller 30 determines placement of each of a plurality of marks 60 at the interval. When the mark discharge assembly 50 activates the marker 24, the mark made may have a length of between 0.25 inches to 2 inches (approx. 0.5 cm to 5 cm). Each of the plurality of marks 60 may have a length further between 0.25 inches to 1.75 inches (approx. 0.5 cm to 4.5 cm), between 0.25 inches to 1.0 inches (approx. 0.5 cm to 2.5 cm), or between 0.75 inches to 1.25 inches (approx. 2 cm to 3 cm). The marker 24 may be activated over approximately one inch (approx. 2.5 cm) of the circumference of the roller 30. The circumference over which the marker is activated determines the length of the mark. The mark may be a dot or a dash. A roller 30 may be a wheel having a circumference of approximately 6 inches (approx. 15 cm), where the marker 24 may be disengaged for approximately 5 inches (approx. 12.5 cm) of the 6-inch circumference.

An operator may operate marking device 100 by holding the edge rail 12 against the edge 82 of the material to be marked. The operator may grasp the first handle 92 to hold the marking arm 18 downward and the second handle 94 on the edge of the platform 10 to maintain the edge rail 12 against the edge 82 of the material 80 as the operator walks alongside the material 80.

The marker 24 may be a compressible colorant marker such as an aerosol spray device or spray discharge assembly mounted on the marker mount 20. The aerosol spray device may be a pressurized spray can of marking paint that is inverted and placed into the marker mount 20. A spray nozzle of the spray can may face towards the top surface 84 of the material 80. As shown in FIG. 1, marker 24 has a marker activator 26 that is a moveable valving arrangement. The moveable valve arrangement may activate a compressible valve stem of a spray nozzle to activate a spray of colorant 28 to mark the top surface 84 of the material 80. Compression of the valve stem past the first limit position 48 (in the direction of movement arrow 46) opens the spray nozzle to cause the spray of colorant 28 to be released through the aperture 22 of the marking arm 18. Decompression of the valve stem away from the first limit position 48 (in the direction of movement arrow 44) closes the spray nozzle to cause the spray of colorant 28 to be inhibited of release from the marker 24.

As shown in FIG. 1, attached to platform 10 is marker mount 20 which is configured to receive and hold a marker 24. Marker mount 20 may be a hollow sleeve that is cylindrically or conically shaped. In one example, the marker mount 20 may be a cylindrical sleeve defining a receptacle sized and configured to receive an aerosol paint container within the sleeve. Alternatively, marker mount 20 may comprise at least one annular ring sized to receive an aerosol paint container. The circumference of marker mount 20 may be adjustable by way of a releasable fastener such that the circumference of marker mount 20 may be enlarged when the releasable fastener is released to facilitate ease of inserting an aerosol paint container into marker mount 20. The circumference of marker mount 20 may be constricted when the releasable fastener is fastened to position, secure, and retain the aerosol paint container in the marker mount 20. The marker mount 20 may be removably attached to the marking arm 18. In one such example, a ribbed coupling or quick release bracket attaches the marker mount 20 to the marking arm 18. Marker mount 20 may have a height that is perpendicular to the longitudinal axis of the marking arm 18 for receipt of elongated spray cans used as the marker 24.

The releasable fastener may be any fastener such as, but not limited to, a screw, a clamp, or a spring release mechanism. In the example shown, marker mount 20 is coextensive with the aperture 22 disposed through the marking arm 18 of the platform 10. Preferably, the releasable fastener is configured to hold the aerosol paint container in an inverted position such that the contents of the aerosol paint container may be discharged through the aperture onto the top surface 84 of the material 80 when triggered. The releasable fastener May comprise a strap, rope, cable, bungee cord, a ratchet strap, or a zip tie. The releasable fastener may be self-tensioning, for example, the tether or a portion thereof may be configured from an elastic material.

The structural components of the marking device 100 may be made with or without any external milling from any general lightweight materials including wood, plastic such as high-density polyethylene (HDPE), UHMW, fiberglass, carbon fiber, metal such as aluminum with an anodized finish to prevent marring, or a combination of these or other materials. Manufacturing methods, such as plastic molding and laser cutting, can be envisioned, and utilized by those with ordinary skill in the art for the manufacture of 4 structural components of the marking device 100. Constructing the marking device 100 with lightweight materials aids the ease of use. The total weight of the marking device 100 may be between 0.5 pounds (lbs) and 5 lbs (approx. 0.25 kilograms (kg) to 2.25 kg). In one example, the marking device 100 weighs approximately 1.5 lbs (approx. 0.7 kg).

Figure 3:
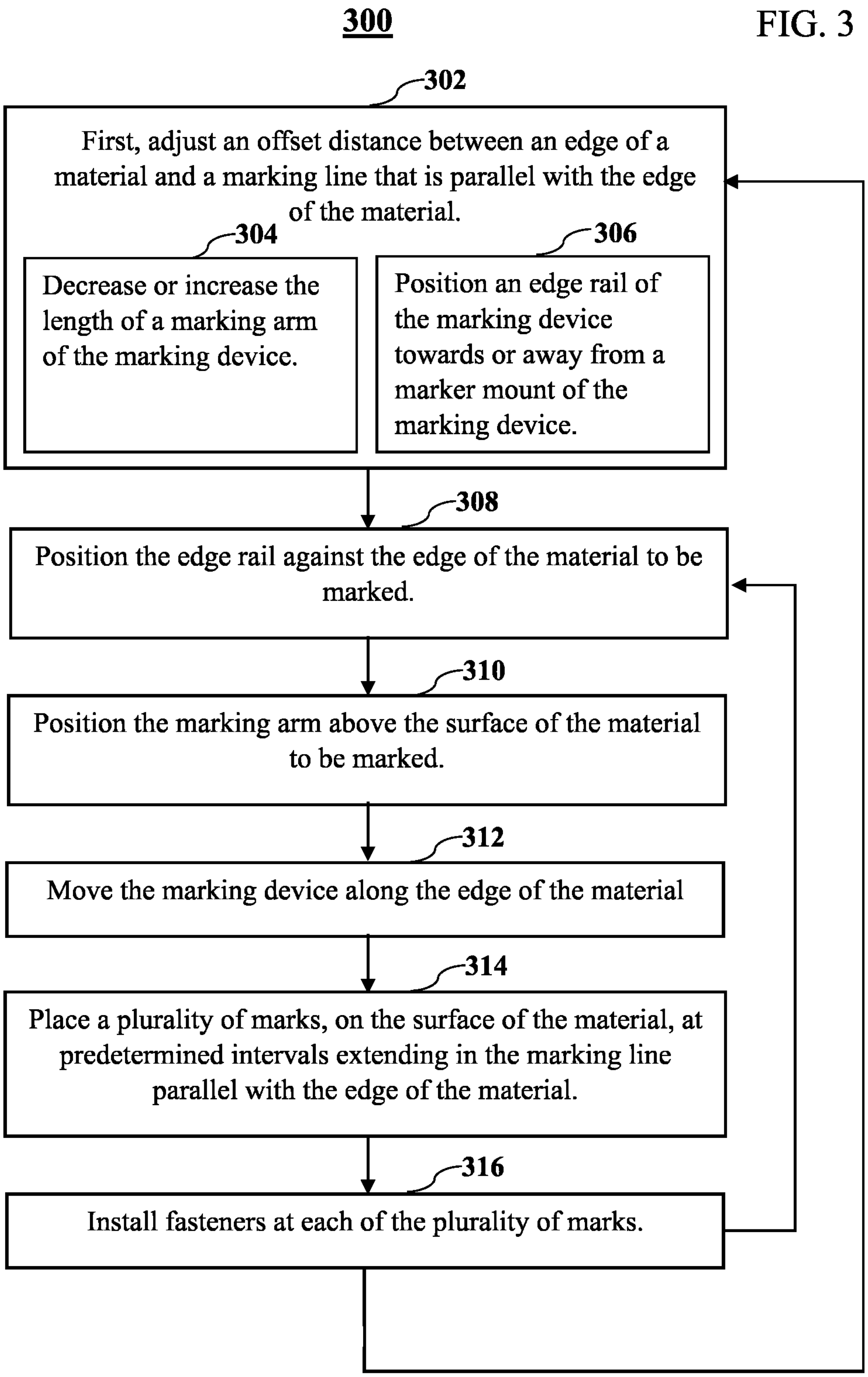
FIG. 3 is a flowchart depicting a method for marking material with visual indicia at predetermined, measured intervals.

A flowchart for a method 300 of marking construction material, such as construction sheathing and/or drywall, is shown in FIG. 3. First, the method comprises an adjustment to an offset distance between an edge of the construction material and a marking line that is parallel with the edge of the material, according to step 302. Step 302 comprises the following optional sub steps: the length of a marking arm of the marking device is decreased or increased to adjust the offset distance, according to step 304; or an edge rail of the marking device is moved towards or away from a marker mount on the marking device to adjust the offset distance, according to step 306. The edge rail is positioned against the edge of the construction material to be marked, according to step 308. The marking arm is positioned above the top surface of the construction material to be marked, according to step 310. A marker may be held in the marker mount on the marking arm extending laterally from the edge rail. The code marking device is moved along the edge of the construction material by the operator, according to step 312. During step 312, the edge rail is maintained 22 in contact with the edge of the construction material, where the edge rail extends longitudinally with the edge of the material. The marker held by the marker mount is activated by the mark discharge assembly which is mechanically connected to the roller mounted to the marking arm. The code marking device dispenses a plurality of marks to form an interrupted marking line on a top surface of the construction material at predetermined intervals extending in the marking line that is parallel with the edge of the construction material, according to step 314. The interrupted marking line is formed in response to rotation of the roller about an axis perpendicular to the edge rail. The operator installs fasteners at the plurality of marks, according to step 316. The method may be repeated when the code marking device is placed against and upon a second material that may be a second construction sheath. Alternatively, a second adjustment of the offset distance between the edge of the construction material and the marking line that is parallel with the edge of the material may be made by the operator.

Figure 4:
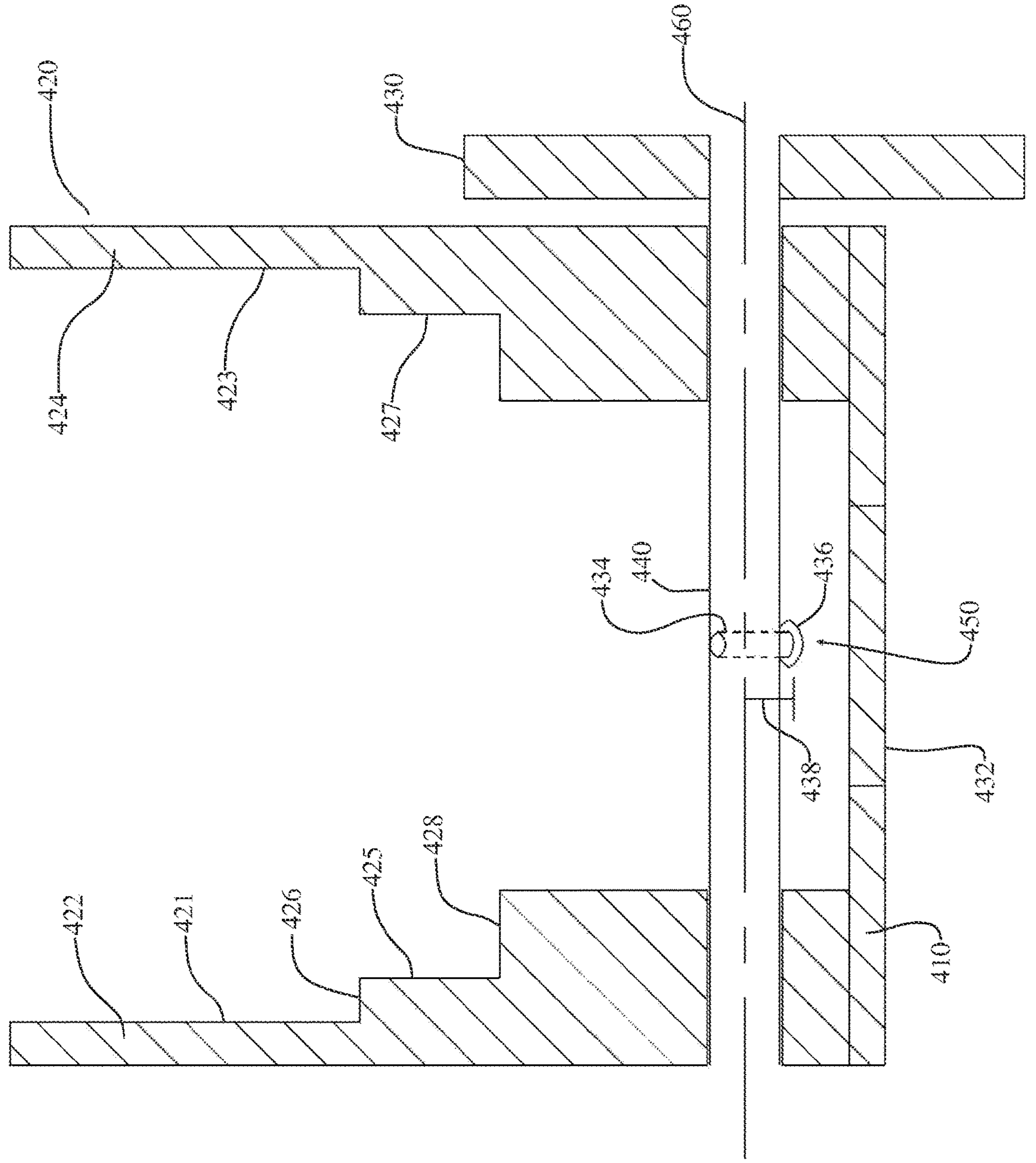
FIG. 4 is a side view depicting a camshaft passing through a marker mount assembly shown in cross-section.

Different configurations of the marker mount assembly and mark discharge assembly are possible. As shown in FIG. 4, marker mount assembly 420 is comprised of one or more marker mounts attached to platform 410. The marker mount defines a receiving area for a marker container. The space between a first marker mount 422 and a second marker mount may accommodate the size and shape of the marker container selected.

In the example shown, the distance between a first upper sidewall 421 and a second upper sidewall 423 of the first marker mount 422 and the second marker mount 424, respectively, is 2¾ inches (approx. 7 cm). The distance between a first lower sidewall 425 and a second lower sidewall 427 of the first marker mount 422 and the second marker mount 424, respectively, is 2⅜ inches (approx. 6 cm). A standard aerosol spray can may be inverted 9 and rest within the marker mount assembly 420 having such dimensions. Other spacings between the marker mounts may be realized based on dimensions of the marker container utilized.

Interior surfaces of the marker mount assembly 420 may correspond to an exterior shape of the marker container. For example, the exterior surface of an aerosol spray can may have several shoulders extending horizontally at 90 degrees from a vertical plane extending with the spray can body. The marker mount assembly 420 may be designed to have shoulders that oppose the shoulders of the aerosol spray can that is inverted and resting within the marker mount assembly 420. As shown in FIG. 4, a first upper shoulder 426 may be disposed at approximately 1¼ inches (approx. 3 cm) below a top surface of the first upper sidewall 421. A first lower shoulder 428 may be disposed at ½ inch (approx. 1 cm) from the first upper shoulder 426. The separation distance between shoulders in the first marker mount 422 may be mirrored by shoulders of the second marker mount 424. Paired shoulders May have equal heights above platform 410 to be level with one another. The corresponding shape of the interior surfaces of the marker mount assembly 420 and the exterior surfaces 24 of the marker container allows for the marker container to rest securely within the marker mount assembly 420.

The mark discharge assembly may be mechanically connected to the roller in several configurations and have varied components. As shown in FIG. 4, one configuration of the mark discharge assembly 450 has the following components: (a) a camshaft 440 mechanically connected to the roller 430, the camshaft 440 includes: (i) a threaded rod 434 disposed through the camshaft 440; and (ii) a trigger end 436 on a distal end of the threaded rod 434. The trigger end 436 is operable to rotate with the camshaft 440 to activate a marker upon rotation of a roller 430.

The camshaft 440 of the mark discharge assembly 450 may pass through the housing of the marker mount assembly 420. The camshaft 440 may be mounted to the housing by placement of fasteners, such as snap rings, on the distal end of the camshaft 440 located past an outside surface of the housing. As shown in FIG. 4, a longitudinal axis 460 of the camshaft 440 is disposed through a center point of the roller 430. The camshaft 440 shown is ¼ inch (approx. 0.6 cm) in diameter. However, other diameters may be realized and utilized based on the size and dimensions of the marking device designed. The camshaft 440 rotates within the housing of the marker mount assembly 420 when the roller 430 contacts the material and the marking device is moved across the surface of the material.

In the case where an aerosol spray can is used as the marker, the trigger end 436 may have a trigger offset 438. The trigger offset 438 may be adjusted by loosening or tightening the threaded rod 434 disposed within the camshaft 440. Loosening or tightening of the threaded rod 434 causes the trigger end 436 to be adjusted towards or away from the marker activator of the marker. If a longer mark is desired, then the threaded rod 434 is loosened to extend the trigger end 436 outward, away from the longitudinal axis 460 of the camshaft 440. If a shorter mark is desired, then the threaded rod 434 is tightened to retract the trigger end 436 inward, towards the longitudinal axis 460 of the camshaft 440. The mark forms after the spray of colorant passes through a marking aperture 432 of the platform 410. The trigger end 436 may be rounded or arched to prevent snagging on the marker activator of the marker, the marker mount assembly 420, or platform 410.

Figure 5:
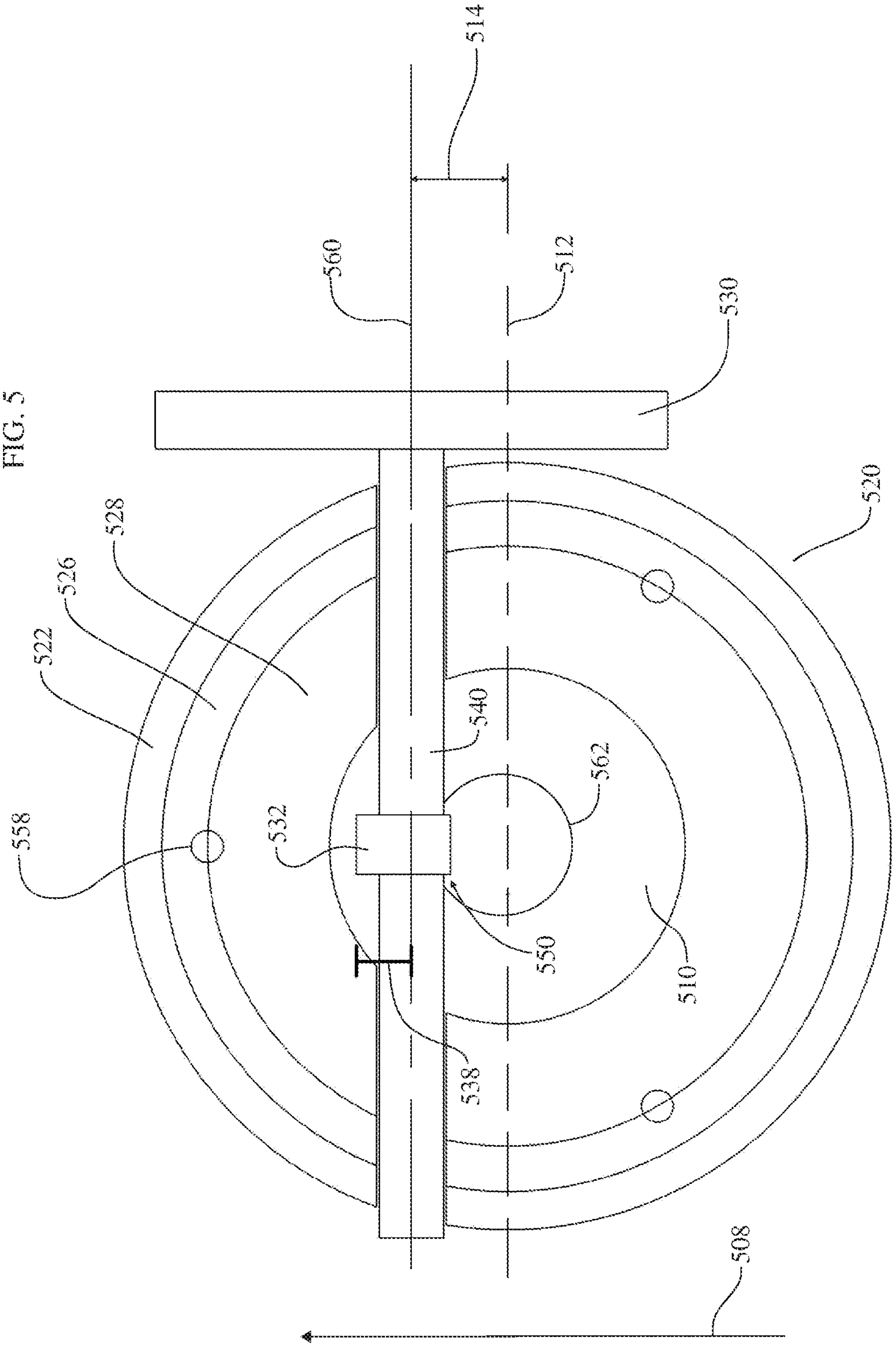
FIG. 5 is a top view depicting another example of a camshaft and marker mount.

Alternatively, a pointed cam 532 may be utilized in place of the combination of the threaded rod and trigger end. The pointed cam 532 may be mechanically connected to a camshaft 540. The pointed cam 532 extends perpendicularly from a longitudinal axis 560 of the camshaft 540 disposed through a center point of the roller 530. As shown in FIG. 5, pointed cam 532 of the camshaft 550 is operable to rotate about the longitudinal axis 560 of the camshaft 540 upon rotation of the roller 530 mechanically connected to a distal end of the camshaft 540. Rotation of the pointed cam 532 activates a marker mounted on the marker mount 520 to dispense a first mark of colorant through a marking aperture 562 disposed in a platform 510 of the marking device.

Figure 6:
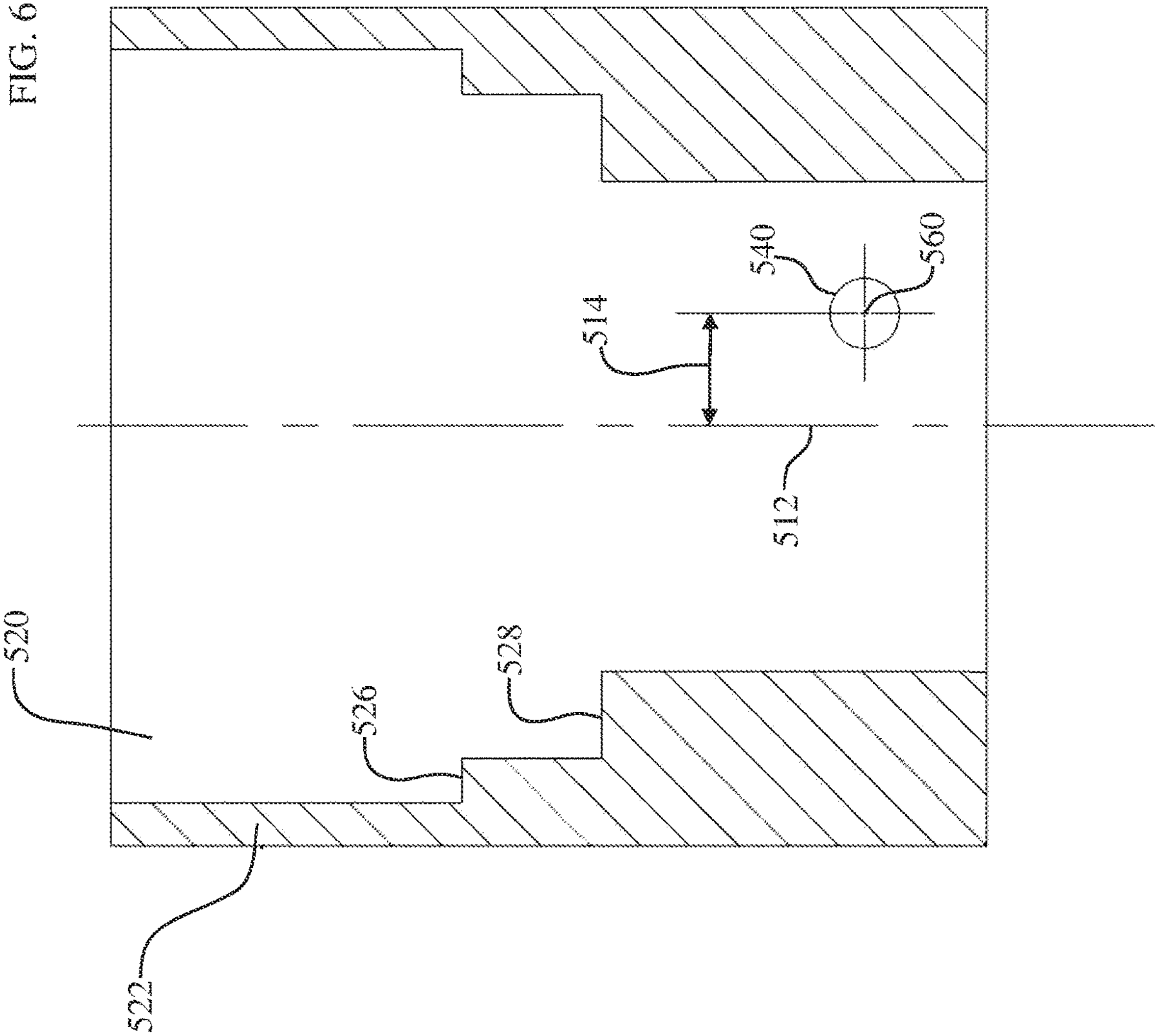
FIG. 6 is a side view depicting the camshaft and marker mount of FIG. 5 in cross-section.

As shown in FIG. 5, or FIG. 6 which is shown cross sectionally, the longitudinal axis 560 of the camshaft 540 may be laterally offset and parallel with a center line 512 of marking aperture 562. This offset forms what is herein referred to as a center offset 514. The center offset 514 formed by mounting the camshaft 540 away from center line 512 may be a distance of between 1/16 of an inch to 1 inch (approx. 0.15 cm to 2.5 cm). The center offset 54 may include a distance further between ⅛ of an inch to 15/16 of an inch (approx. 0.3 cm to 2.4 cm), between 3/16 of an inch to ⅞ of an inch (approx. 0.5 cm to 2.2 cm), between ¼ of an inch to 13/16 of an inch (approx. 0.6 cm to 2.1 cm), between 5/16 of an inch to ¾ of an inch (approx. 0.8 cm to 1.9 cm), or between ⅜ of an inch to 11/16 of an inch (approx. 1 cm to 1.7 cm). The distance of the center offset 514 may be 7/16 of an inch (approx. 1.1 cm), ½ of an inch (approx. 1.3 cm), or 9/16 of an inch (approx. 1.4 cm) in order to accommodate the length of the pointed cam 532.

The center line 512 of the marking aperture 562 is perpendicular to a longitudinal path (see movement arrow 508) of marks made by the marking device as it continues to slide along an edge of the material. The pointed cam 532 of the camshaft 540 rotates about the longitudinal axis 560 that is perpendicular to the longitudinal path (see movement arrow 508) of the marking device when sliding along an edge of the material. The pointed cam may have a cam offset 538 which serves a similar purpose to the trigger offset 438. The amount of time an activator is contacted by the pointed cam 532 depends on the length of the pointed cam 532 extending perpendicularly out from the longitudinal axis of the camshaft 540. When the cam offset 538 is longer, the pointed cam 532 will contact the marker activator of the marker for a longer period. When the cam offset 538 is shorter, the pointed cam 532 will contact the marker activator of the marker for a shorter period.

The pointed cam 532 may extend away from the longitudinal axis 560 of the camshaft 540 to form a cam offset 538 having a length of between 1/16 of an inch to 1 inch (approx. 0.15 cm to 2.5 cm). The cam offset 538 may be further between ⅛ of an inch to 15/16 of an inch (approx. 0.3 cm to 2.4 cm), between 3/16 of an inch to ⅞ of an inch (approx. 0.5 cm to 2.2 cm), between ¼ of an inch to 13/16 of an inch (approx. 0.6 cm to 2.1 cm), between 5/16 of an inch to ¾ of an inch (approx. 0.8 cm to 1.9 cm), or between ⅜ of an inch to 11/16 of an inch (approx. 1 cm to 1.7 cm) in length. The length of the cam offset 538 may be 3/16 of an inch (approx. 0.5 cm), ¼ of an inch (approx. 0.6 cm), or 5/16 of an inch (approx. 0.8 cm) for the length of the pointed cam 532.

The housing of marker mount 520 shown in FIG. 5 and FIG. 6 is cylindrical. The cylindrical housing, which may be made of UHMW, is shaped as a sleeve to receive an aerosol spray can that is also cylindrical in shape. Shoulders of the marker mount 520 may have a circumference that facilitates the ease of inserting an aerosol spray paint can into the marker mount 520. The first lower shoulder 528 may have a smaller circumference to retain the mounting cup or top dome of the aerosol spray can. The first upper shoulder 526 may have a larger circumference to seat the top body of the aerosol spray can. A sidewall 522 of marker mount 520 may be mounted upon platform 510 of the marking device and support the body of the aerosol spray can placed therein. Several fasteners, such as the first fastener 558, may secure the marker mount 520 to platform 510 of the marking device.

Figure 7:
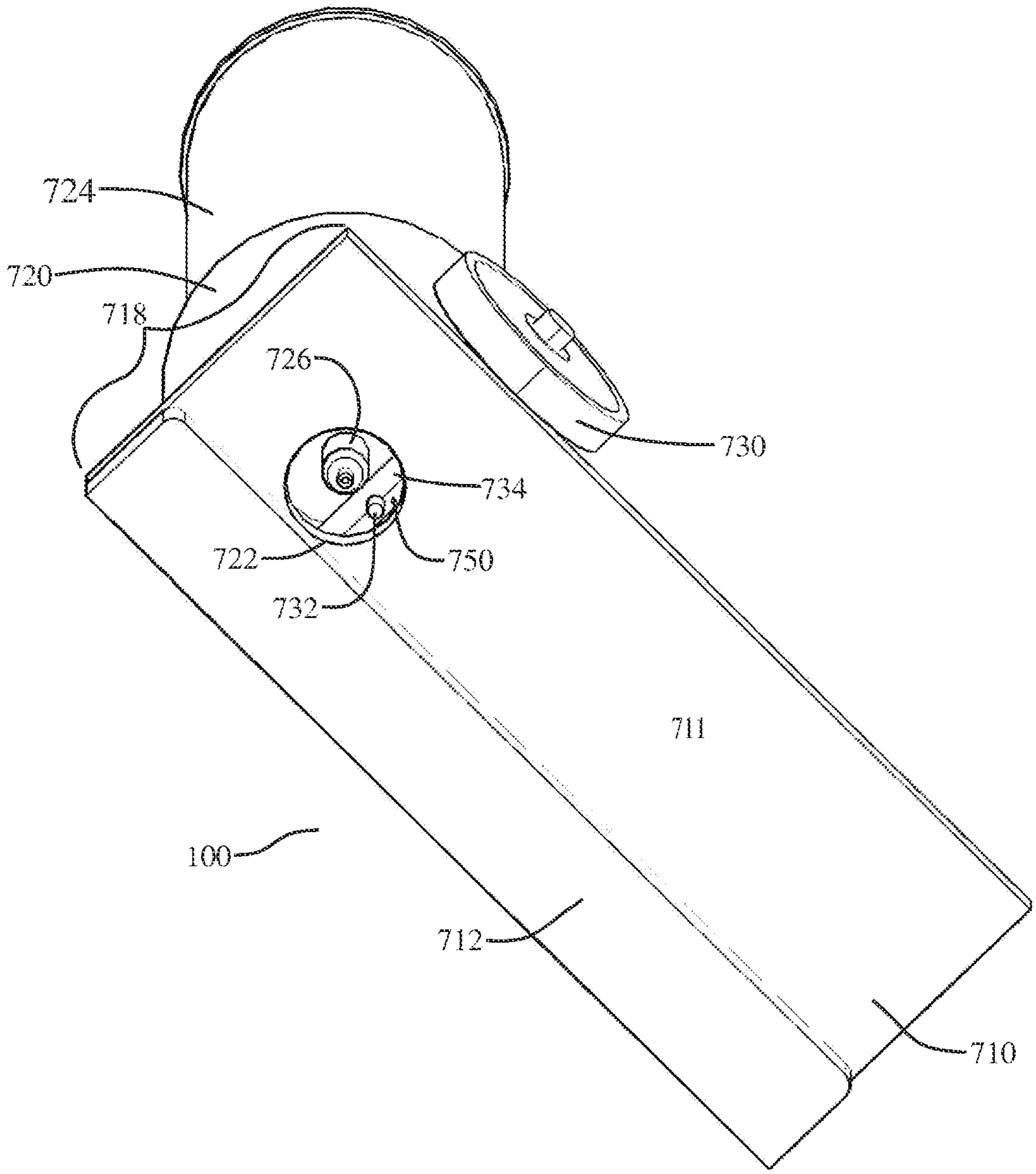
FIG. 7 is a bottom perspective view of an example marking device showing the mark discharge assembly passing through the marker mount.

FIG. 7 shows the mark discharge assembly 750 in relation to the marker activator 726 while looking towards a bottom surface 711 of another example of the marking device 100. Rotational motion of a roller 730 mechanically connected to a camshaft 734 converts into rotational motion of a trigger cam 732 to activate the marker activator 726. The marker activator 726 may activate for every rotation of the roller 730. Note that FIG. 7 depicts the trigger cam 732 rotated downwards, away from the activator, into a disengaged position. Therefore, a spray of colorant from marker 724 is not being released. The mark discharge assembly 750 activates the marker 724 when the trigger cam 732 revolves towards a first limit position into contact with the marker activator 726 to spray colorant through the aperture 722 of platform 710. In this example, the length of the marking arm 718 extending perpendicularly away from the edge rail 712 is shorter than the previous device examples shown. A marking arm 718 that is shorter allows for closer placement of the marker mount 720 to the edge rail 712. The length of the marking arm 718 in this case may range from two inches to four inches (approx. 5 cm to 10 cm). Therefore, placement of marks is closer to edge of the material.

Figure 8:
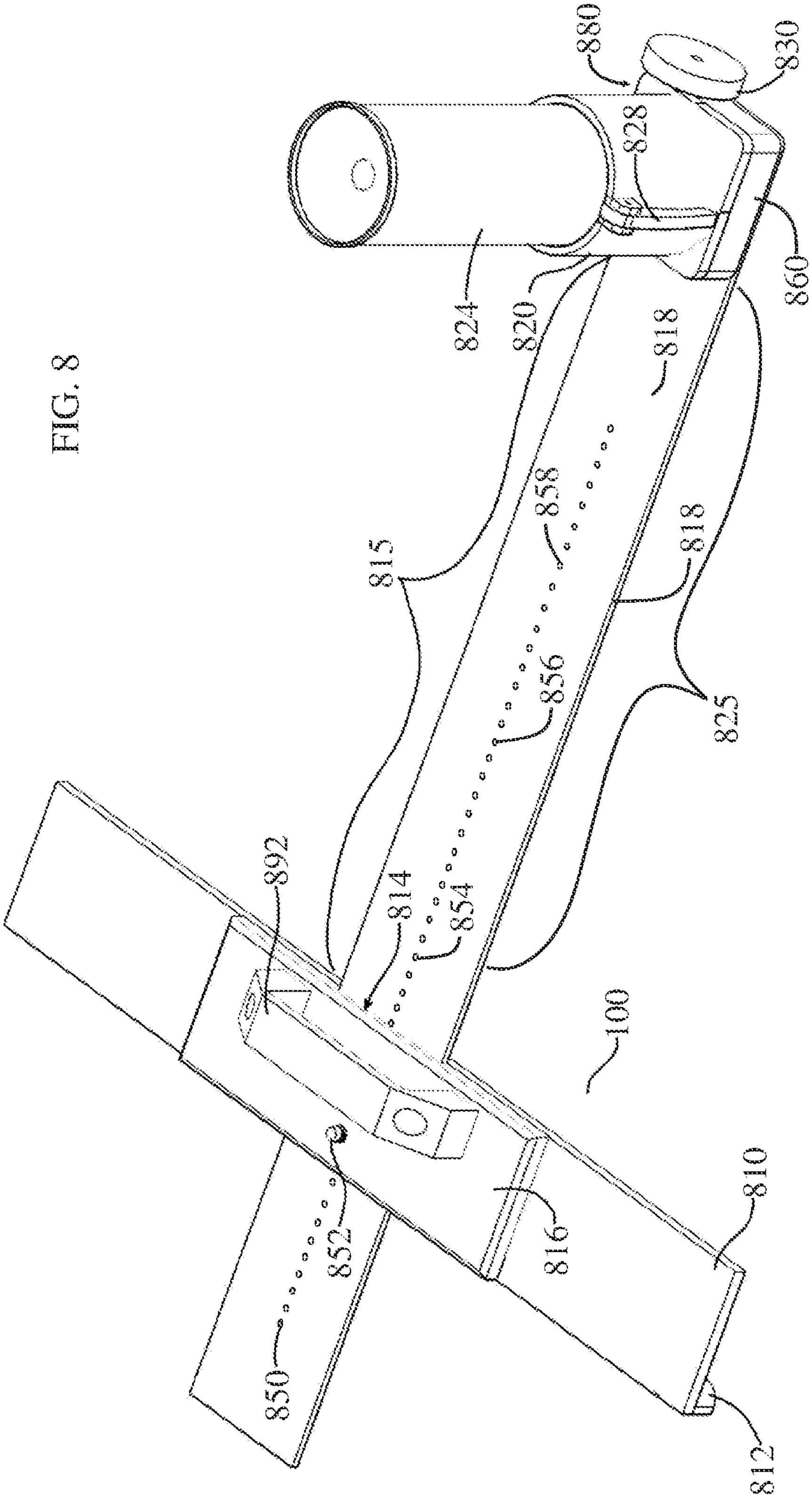
FIG. 8 is a side perspective view of an example marking device having a spring-assisted detent mechanism to fix placement of the marking arm.

Now referring to FIG. 8, another example of the marking device 100 is shown comprising the following structural components: (a) a platform 810 including: (i) an edge rail 812 that extends longitudinally; (b) a marking arm 818 that extends perpendicularly from the edge rail 812; (c) a marker mount 820 disposed upon a distal end of the marking arm 818; (d) a roller 830 mounted to the distal end of the marking arm 818; and (e) a mark discharge assembly 880 including:

(i) a camshaft (not shown) mechanically connected between the roller 830 and the marking arm 818, where the camshaft has rotational motion about an axis that is perpendicular to a longitudinal edge of the edge rail 812.

Several features make this version of the marking device an overall lighter and functionally simpler design. The marking device 100 shown in FIG. 8 has the following features and advantages: (a) lightweight construction using materials such as aluminum; (b) easy-slide functioning of marking arm 818 through aperture 814 disposed between the platform 810 and a retention plate 816 attached to the platform 810; (c) a detent mechanism 852, such as a spring catch, disposed through the retention plate 816 or platform 810 to lock the movement of the marking arm 818 in place at one of the detent apertures 850, 854, 856, 858; and (d) a platform 810 and edge rail 812 that may be made of low-friction materials such as UHMW.

The mark discharge assembly 880 activates the marker 824 secured within the marker mount 820 by retention fastener 828. Retention fastener 828 may be any number of clamps, bungees, clasps, flexible annular rings, or fastening devices recognized by one of ordinary skill. Marker mount 820 may have a height that is perpendicular to the longitudinal axis of the marking arm 818 for receipt of elongated spray cans used as the marker 824. As discussed previously, the marker 824 activates in response to rotational motion of the roller 830. The roller 830 may be disposed through a base mount 860 which supports the marker mount 820.

The base mount 860 may be removably attached to the marking arm 818. In one such example, a ribbed coupling or quick release bracket attaches the base mount 860 to the marking arm 18. Alternatively, base mount 860 may be removably attached to an arm of a construction ruler, such as a T-square, by way of a magnet, 3M™ adhesive, or another appropriate fastener. The base mount 860 may comprise upper and lower base plates as discussed below in the description for FIG. 9.

The marking arm 818 may be adjusted and locked at one of the detent aperture locations with the detent mechanism 852. Detent apertures may be laterally spaced apart along the marking arm 818 every quarter inch (approx. 1 cm) to every 6 inches (approx. 15 cm). In the case of marking for construction codes, detent apertures 850, 854, 856, 858 may correspond to standard distances between wall stud spacings. An operator may easily position the marking arm 818 to establish a first offset distance 815 for one job site and quickly and easily establish a second offset distance 825 for a second job site.

Across construction regions, 16-inch centers may be standard code intervals for fastener placement of construction sheathing or drywall placed onto wall and/or roof studs. In the example shown, the first offset distance 815 of the marking arm 818 may have been set for placement of marks at 20-inch centers. The operator may retract the marking arm 818 rearward to decrease the distance between the marker mount 820 and the handle 892 when the detent mechanism 852 is released. The detent mechanism 852 may lock the marking arm 818 into place for 16-inch centers when the marking arm 818 is slid and secured at the second offset distance 825. In this case, a detent mechanism that is spring assisted is utilized.

The spring will release a detent through an aperture in the retention plate 816 to engage detent aperture 854 disposed in the marking arm 818 for placement of marks at 16-inch centers. Alternatively, the marking arm 818 may slide forward to increase the distance between the marker mount 820 and the handle 892 for placement of the marking arm 818 into a third offset distance. The spring may release the detent into detent aperture 850 when the detent mechanism 852 reaches the adjustment for 24-inch centers. Multiple marking intervals are possible based on detent aperture placement locations along the length of the marking arm 818. Alternatively, or in combination, a plurality of measurement markings may be etched or printed on the marking arm 818 to indicate offset distances.

Figure 9:
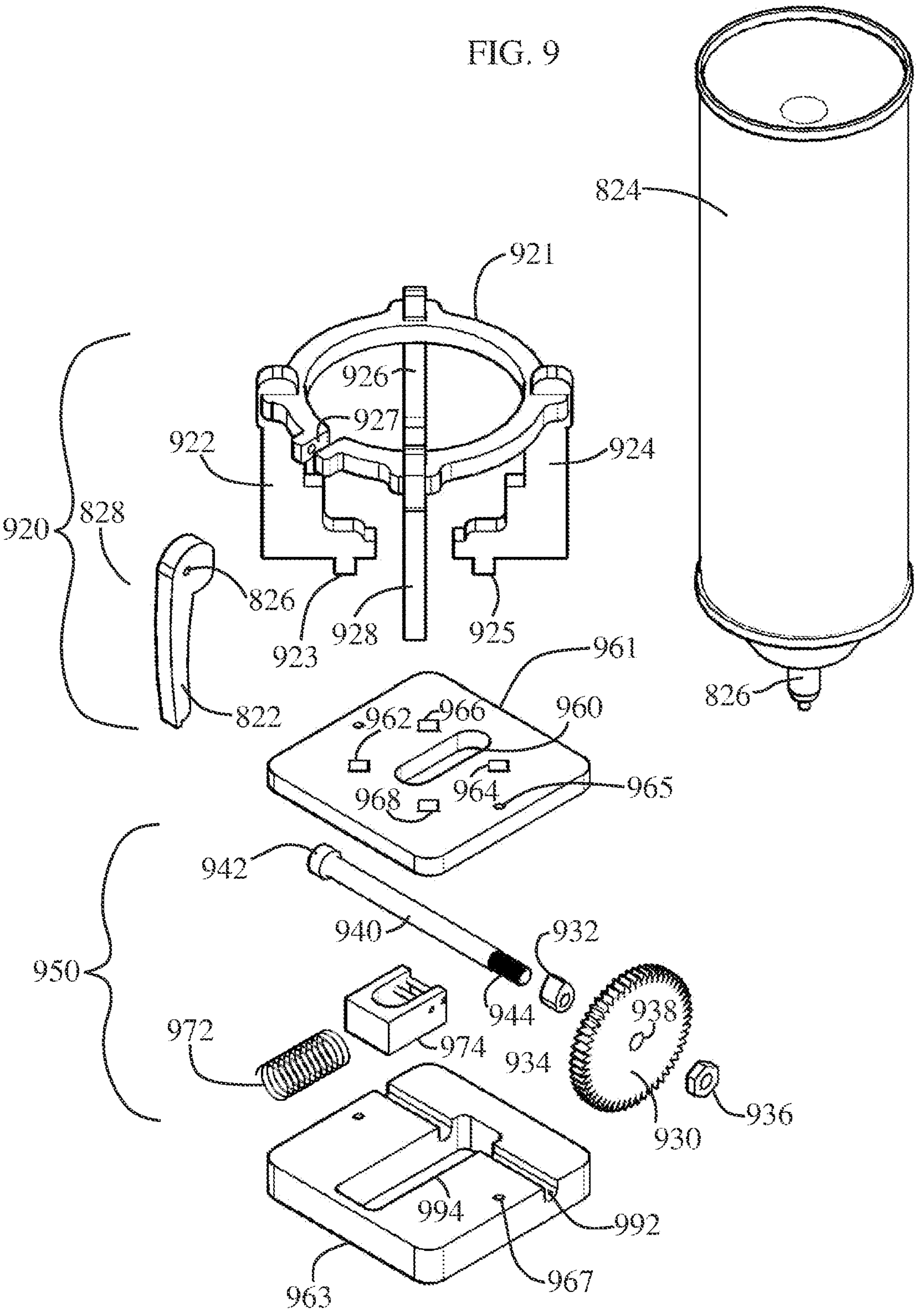
FIG. 9 is an exploded view depicting components of an example of the marker mount assembly and mark discharge assembly.

FIG. 9 is an exploded view depicting another example of a marker mount assembly 920 and mark discharge assembly 950 with associated components shown in a disassembled arrangement. The marker mount assembly 920 is comprised of one or more marker mounts 922, 924, 926, 928. Marker mounts 922, 924, 926, 928 may define a receiving area for the marker 824. The space between the first marker mount 922 and second marker mount 924 may be sized and shaped to accommodate a corresponding size and shape of the marker container selected. As discussed previously, interior surfaces of the marker mount assembly 920 may correspond to an exterior shape of the marker container. The corresponding shape of the interior surfaces of the marker mount assembly 920 and the exterior surfaces of the marker container allow for the marker container to rest securely within the marker mount assembly 920.

Marker 824 received within marker mount assembly 920 may be a compressible colorant marker such as an aerosol spray device or spray discharge assembly. As shown in FIG. 9, marker 824 is a pressurized spray can of marking paint that is inverted and mountable within the space between marker mounts 922, 924, 926, 928. Marker mounts may be connected to and vertically support a marker holster 921 that retains the marker 824 in place.

Marker holster 921 may be structured as a cylindrical sleeve that is configured to hold the cylindrical body of the marker 824 received within marker mount assembly 920. Marker holster 921 may be connected to the upper ends of marker mounts 922, 924, 926, 928 to further stabilize the marker container held within the marker mount assembly 920. Marker holster 921 may comprise a retention fastener 828. Retention fastener 828 may be inserted into a fastener slot 927 disposed in the marker holster 921. A fastener may be disposed through the marker holster 921 and the retention fastener 828 for mounting of the two components together. Retention fastener 828 may be a clamp-type lever that is configured to constrict the marker holster 921 circumferentially about the body of the marker container.

Marker mounts 922, 924, 926, 928 may be attached to a base mount, platform, or marking arm of the marking device. As shown in FIG. 9, marker mounts 922, 924 comprise tabs 923, 925 for connection with the base mount that supports the marker mount assembly and mark discharge assembly mounted to the marking arm of the marking device. For example, tabs 923, 925 mounted on bottom ends of marker mounts 922, 924 may insert into any one of tab apertures 962, 964, 966, 968 disposed in an upper base plate 961 of the base mount. The upper base plate 961 may be mounted to a lower base plate 963 of the base mount. Fasteners placed through fastener apertures 965, 967 secure the upper base plate 961 to the lower base plate 963.

A marker activator 826 of the marker 824 may be inserted downwardly through a slotted aperture 960 in the upper base plate 961. The slotted aperture 960 provides an opening in the upper base plate 961 in which the marker activator 826 can operably move. In the case where the marker 824 is an aerosol spray can with a nozzle, movement of the nozzle causes a spring-biased valve in the valve stem of the aerosol paint container to open and dispense a marking colorant contained within the aerosol paint container. The marker activator 826 may be operably moved into an activated position by a cam device, spring-loaded actuator, cylindrical actuator, or a camshaft mounted to the roller 930.

Figure 10:
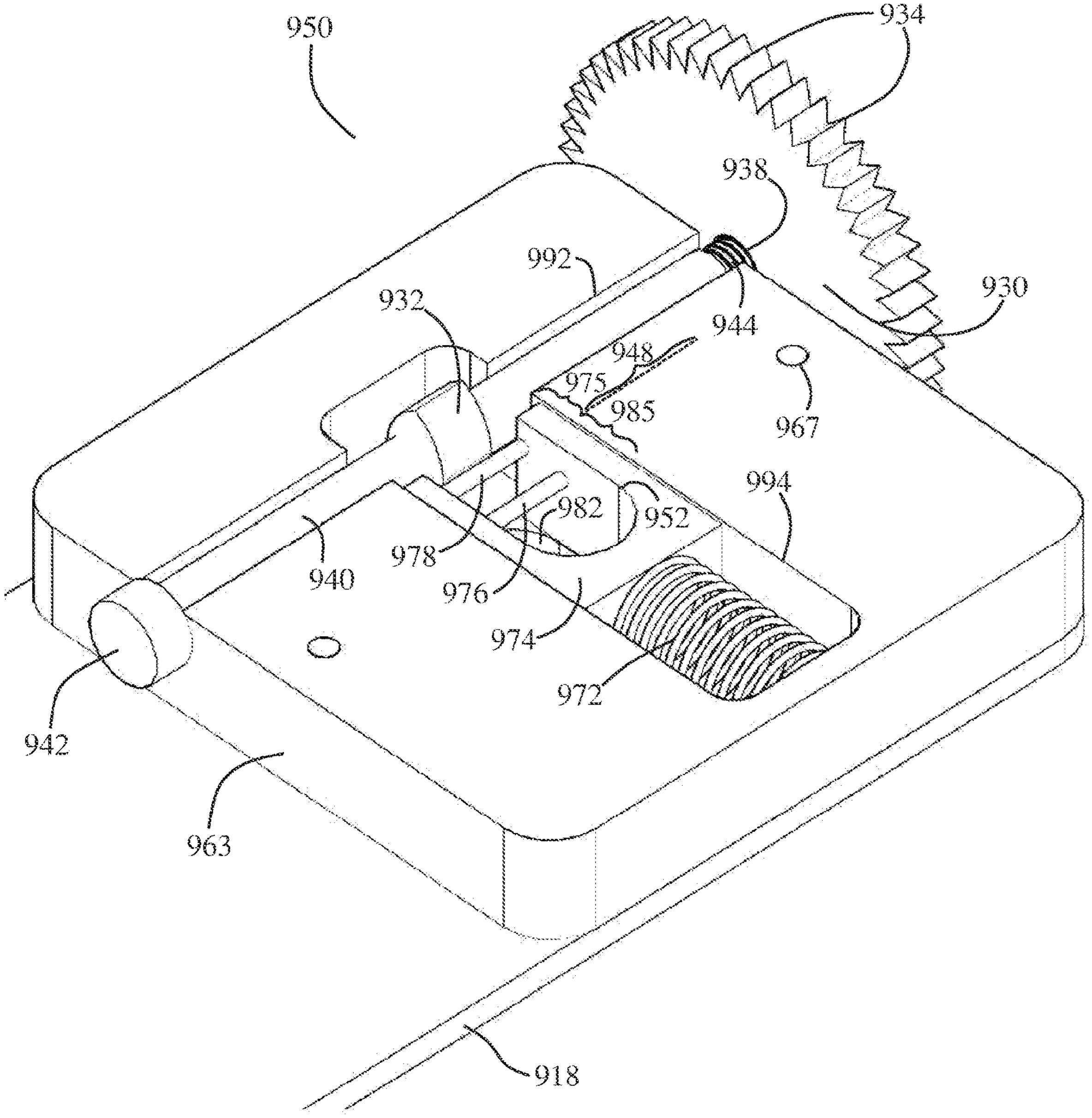
FIG. 10 is a side perspective view depicting the mark discharge assembly from FIG. 9 with associated components assembled and mounted to a marking arm of the marking device.

As shown in FIG. 9 and FIG. 10, a camshaft 940 is configured to serve as an axle when mounted to roller 930. The camshaft 940 may comprise a first end 942 and a second end 944. The first end 942 may be capped to retain the camshaft 940 within a slotted groove 992.

The slotted groove 992 may be a channel, dado, furrow, or other groove disposed within the lower base plate 963. The groove may extend along a width of the lower base plate 963. The slotted groove 992 may be lined with a low-friction material such as UHMW to facilitate smooth and stable rotation of the camshaft 940.

The upper base plate 961, when mounted to the lower base plate 963, may cover and secure the camshaft 940 positioned within the slotted groove 992. The second end 944 may be threaded so that a threaded nut 936 screwed onto the second end 944 can secure the roller 930 onto the camshaft 940. Alternatively, a central aperture 938 of the roller 930 may be threaded so that the roller 930 may be screwed directly onto the second end 944.

A pointed cam 932 may be an integral part of the camshaft 940. The pointed cam 932 may be a separate component that is slid and friction fitted onto the camshaft 940. The pointed cam 932 may be positioned between the first end 942 and the second end 944. The pointed cam 932 may rotate about a longitudinal axis of the camshaft 940 when the roller 930 is rotated to activate the marker activator 826.

Rotation of the roller 930 imparts rotational motion to the camshaft. Rotation of the pointed cam 932 converts the rotational motion of the camshaft 940 into an actuating motion that may be perpendicular to the longitudinal axis of the camshaft 940. Rotation of the pointed cam 932 may activate the marker activator 826, by direct contact, over a contact surface of the pointed cam 932. Alternatively, rotation of the pointed cam 932 may activate the marker activator 826, by indirect contact, through a trigger member 974.

Trigger member 974 is structured to activate the marker activator 826. As discussed previously, the marker activator 826 may be a nozzle of an aerosol spray can that serves as the marker 824. The trigger member 974 is structured to receive the nozzle of the marker. The trigger member 974 may be U-shaped block with a nozzle gap 952 that is sized to receive the marker activator 826. Alternatively, the trigger member 974 may be O-shaped, rectangle shaped, or other shape having the nozzle gap sized to receive the nozzle.

The trigger member 974 may be mounted directly to a surface of the marking arm 918. Alternatively, the trigger member 974 may be mounted to the base mount, which is mounted to the surface of the marking arm 918. As shown in FIG. 10, the trigger member 974 is received within a slotted gap 994 disposed in the lower base plate 963 of the base mount. The trigger member 974 within the slotted gap 994 may be aligned with the pointed cam 932 in perpendicular alignment relative to the longitudinal axis of the camshaft 940. The perpendicular alignment may allow the pointed cam 932 to move the trigger member 974 within the slotted gap 994 away from the camshaft. Pointed cam 932 moves the trigger member 974 from an inactive position 975 to an activated position 985.

Note that FIG. 10 depicts the pointed cam 932 rotated upwards in a disengaged position, away from the trigger member 974, so that the trigger member 974 is in the inactive position 975. As a result, a nozzle of a marker disposed within the nozzle gap 952 would not be releasing a discharge of colorant. When the pointed cam 932 rotates sidewards into an engaged position, towards the trigger member 974, the trigger member 974 is moved into the activated position 985. As a result, the nozzle of the marker disposed within the nozzle gap 952 would be releasing a discharge of colorant.

A first end of the trigger member 974 may come into contact with the pointed cam 932 in the engaged position. A pair of parallel bars may transverse the nozzle gap 952 of the trigger member 974 at the first end. Alternatively, the first end may be a continuous sidewall that enclosed the nozzle gap 952 on the first end of the trigger member 974. As shown more clearly in FIG. 10, transverse bars 976, 978 span the nozzle gap 952 at the first end of the trigger member 974. Transverse bars 976, 978 are mounted to opposing sidewalls of the trigger member 974.

The camshaft 940 may activate trigger member 974 for every rotation of the pointed cam 932 to dispense a single mark. Alternatively, a plurality of cams, placed at different engagement positions along the longitudinal length of the camshaft 940, may activate the trigger member 974 a plurality of times per revolution of the camshaft 940. Trigger member 974 activates the marker activator 826 by being displaced within the slotted gap 994 from the inactive position 975, near the camshaft 940, to an activated position 985, away from the camshaft 940. Movement of the trigger member 974 into the activated position 985 moves the first transverse bar 976 past a first limit position 948. Activation of the trigger member 974 may be a result of the second transverse bar 978 being pushed by the pointed cam 932 that is in the engaged position. As a result of the trigger member 974 sliding into the activated position 985, transverse bar 976 moves past the first limit position 948. Transverse bar 976 may push against and activate the nozzle. Activation of the nozzle causes a marking colorant contained within the aerosol paint container to be dispensed through a marking aperture 982 in the marking arm 918.

A horizontal offset between transverse bars 976, 978 may allow the pointed cam 932 to activate the nozzle of the marker indirectly, without direct contact. The horizontal offset between transverse bars 976, 978 may prevent too much pressure being applied onto the stem of the nozzle. A vertical offset between transverse bars 976, 978, where the first transverse bar 976 is disposed lower than the second transverse bar 978, may allow the stem of the nozzle to be activated at a more distal contact point. The vertical offset between transverse bars 976, 978 may also prevent too much pressure being applied onto the stem of the nozzle. The horizontal and vertical offsets between transverse bars 976, 978 may range from 0.25 inches to 2 inches (approx. 1 cm to 5 cm).

As described, the trigger member 974 may be operable to slide between the inactive position 975 and the activated position 985, and vice versa. An actuator 972 may assist in the return of the trigger member 974 from the activated position 985 back into the inactive position 975. The actuator 972 may be mounted to the marking arm 918 adjacent to trigger member 974. Alternatively, actuator 972 may be mounted to the base mount, which is mounted to the surface of the marking arm 918. As shown in FIG. 10, actuator 972 is received within the slotted gap 994 disposed in the lower base plate 963 of the base mount. Actuator 972 may be a compressed spring disposed between an end of the trigger member 974 and an end wall of the slotted gap 994. The actuator 972 within the slotted gap 994 is aligned with the trigger member 974 in perpendicular alignment relative to the longitudinal axis of the camshaft 940. The perpendicular alignment allows the actuator 972 to move the trigger member 974 within the slotted gap 994 towards the camshaft. Actuator 972 moves the trigger member 974 from the activated position to the inactive position. The actuator 972 may prevent the trigger member 974 from remaining in the activated position, possibly due to a stuck cam, thereby causing the nozzle of the marker to spray colorant continuously.

The marker 824 that is activated may direct a colorant downwardly through the marking 28 aperture 982 (partially shown below trigger member 974) in the marking arm 918 to dispense a mark of colorant onto a surface of the construction material. The marker 824 may dispense a plurality of marks as pointed cam 932 engages and moves the trigger member 974 into the activated position on a periodic basis. The plurality of marks may be placed at evenly spaced marking intervals as the marking device 100 is run along an edge of the construction material. A camshaft having a plurality of pointed cams, or a single cam having multiple points, may cause multiple marking intervals with different spacings as the roller 930 rotates the camshaft.

During operation, the roller 930 mounted to the camshaft will activate the marker 824 for an interval of time during rotation of the roller 930. An outer rim of the roller 930 may be structured with a plurality of projections 934. The plurality of projections 934 may provide further traction and prevent slipping of the roller 930 on construction material having a rough surface. As shown in FIG. 10, the plurality of projections 934 are pointed and triangular in shape. Alternatively, the outer rim of the roller 930 may comprise a traction layer, such as a rubber sleeve.

Clause 1. A construction material marking device comprising: (a) an edge rail that extends longitudinally; (b) a marking arm that extends laterally from the edge rail; (c) a marker mount disposed upon the marking arm, the marker mount structured to hold a marker; (d) a roller mounted to the marking arm, wherein the roller rotates about an axis perpendicular to the edge rail; and (e) a mark discharge assembly mechanically connected to the roller, wherein the mark discharge assembly is configured to activate a marker held by the marker mount to dispense a plurality of marks in an interrupted marking line.

Clause 2. The construction material marking device of clause 1, wherein the marker is activated for a predetermined interval by the mark discharge assembly in response to rotation of the roller.

Clause 3. The construction material marking device of clause 1, wherein the mark discharge assembly is mounted between the roller and the marker on the marking arm.

Clause 4. The construction material marking device of clause 1, further comprising: (a) a detent mechanism structured to adjustably lock the marking arm at one of a plurality of offset distances between the marker mount and the edge rail, wherein the plurality of offset distances comprises 12 inches (approx. 30 cm), 16 inches (approx. 40 cm), and 24 inches (approx. 60 cm).

Clause 5. The construction material marking device of clause 1, wherein the roller is a wheel having a circumference of between 2 inches to 12 inches (approx. 5 cm to 30 cm), the circumference based on a predetermined interval between the plurality of marks.

Clause 6. The construction material marking device of clause 1, wherein the mark discharge assembly comprises: (a) a slider-crank linkage comprising: (i) a connecting rod connected to the roller; and (ii) a trigger arm disposed distal to the connecting rod, wherein the trigger arm is operable to move past a first limit position, in a first direction, to engage the marker and move past the first limit position, in a second direction, to disengage the marker.

Clause 7. The construction material marking device of clause 6, wherein the roller is a wheel having a circumference of between 2 inches to 12 inches (approx. 5 cm to 30 cm) and during rotation of the roller the marker is engaged between 0.25 inch to 1 inch (approx. 0.5 cm to 2.5 cm) of the circumference of the roller and disengaged over the remaining circumference of the roller.

Clause 8. The construction material marking device of clause 1, wherein the mark discharge assembly activates the marker periodically upon rotation of the roller.

Clause 9. The construction material marking device of clause 1, the marking arm comprising: (a) an aperture disposed through the marking arm, wherein the marker that is activated directs the plurality of marks downwardly through the aperture onto construction material.

Clause 10. The construction material marking device of clause 1, wherein the mark discharge assembly: (a) a nozzle trigger member mounted to the marking arm, the nozzle trigger member structured to receive the nozzle of a marker held by the marker mount and to move between an activated position and an inactive position.

Clause 11. The construction material marking device of clause 10, wherein the mark discharge assembly comprises: (a) a camshaft mounted to the roller, the camshaft structured to move the nozzle trigger member from the inactive position to the activated position.

Clause 12. The construction material marking device of clause 11, wherein the mark discharge assembly comprises: (a) an actuator mounted to the marking arm, the actuator structured to move the nozzle trigger member from the activated position to the inactive position.

Clause 13. A method of marking construction comprising: (a) moving a construction material marking device by maintaining contact of an edge rail, that extends longitudinally, along an edge of a construction material; (b) holding a marker in a marker mount disposed upon a marking arm of the construction material marking device, wherein the marking arm extends laterally from the edge rail; (c) activating the marker held by the marker mount with a mark discharge assembly mechanically connected to a roller, wherein the roller is mounted to the marking arm; and (d) dispensing a plurality of marks at predetermined intervals to form an interrupted marking line upon a surface of the construction material in response to rotation of the roller about an axis perpendicular to the edge rail.

Clause 14. The method of clause 13, wherein the plurality of marks extend in the interrupted marking line that is parallel with the edge of the material.

Clause 15. The method of clause 13, further comprising the step of: (a) adjusting an offset distance between the interrupted marking line and the edge of the material by completing the substeps of: (i) releasing a detent mechanism of the marking arm; and (ii) sliding the marking arm through the edge rail which receives the marking arm.

Clause 16. The method of clause 13, further comprising the step of: (a) installing fasteners into the construction material at the plurality of marks dispensed at predetermined intervals.

Clause 17. The method of clause 13, further comprising the step of: (a) sliding the marking arm perpendicular to the edge rail to adjustably lock the marking arm at one of a plurality of offset distances between the marker mount and the edge rail interrupted marking line and the edge of the material, wherein the plurality of offset distances comprises 12 inches (approx. 30 cm), 16 inches (approx. 40 cm), and 24 inches (approx. 60 cm).

It is understood that the invention is not confined to the particular construction and arrangement of parts herein described. That although the drawings and specification set forth a preferred embodiment, and although specific terms are employed, they are used in a 11 description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

I claim:

1. A construction material marking device comprising:

an edge rail that is straight and extends longitudinally to ride in contact with a straight edge of a construction material;

a marking arm that adjustably extends laterally from the edge rail which slidably receives the marking arm;

a marker mount disposed fixedly upon the marking arm at a distal end, the marker mount structured to hold a marker;

a roller mounted to the marking arm, wherein the roller rotates about an axis perpendicular to the edge rail;

a mark discharge assembly mechanically connected to the roller, wherein the mark discharge assembly comprises:

a camshaft mounted to the roller and disposed through a housing of the marker mount, the camshaft structured to move a nozzle of the marker from an inactive position to an activated position; and wherein the mark discharge assembly is configured to activate the marker held by the marker mount to dispense a marking material at predetermined intervals in an interrupted marking line that is laterally offset and parallel with the edge rail; and wherein positionally adjusting the marking arm perpendicular to the edge rail establishes a lateral offset of the marker mount.

2. The construction material marking device of claim 1, wherein the marker is activated periodically for a predetermined interval by the mark discharge assembly in response to each rotation of the roller.

3. The construction material marking device of claim 1, wherein the mark discharge assembly is mounted between the roller and the marker on the marking arm.

4. The construction material marking device of claim 1, further comprising:

a detent mechanism disposed upon the edge rail and structured to adjustably lock the marking arm at one of a plurality of offset distances between the marker mount and the edge rail, wherein the plurality of offset distances comprises 12 inches, 16 inches, and 24 inches.

5. The construction material marking device of claim 1, wherein the roller is a wheel having a circumference of between 2 inches to 12 inches, the circumference based on a predetermined interval between a plurality of marks that form the interrupted marking line upon a surface of the construction material.

6. The construction material marking device of claim 1, wherein the marking arm comprises:

an aperture disposed through the marking arm, wherein the marker that is activated directs a marking material downwardly through the aperture onto a surface of the construction material to form a plurality of marks that correspond to fastener placement intervals.

7. The construction material marking device of claim 1, wherein the lateral offset corresponds with a wall stud spacing for fastener placement.

8. The construction material marking device of claim 1, wherein the lateral offset between the marker mount and the edge rail is 16 inches.

9. The construction material marking device of claim 1, further comprising:

a handle fastened to the edge rail for an operator to maintain the edge rail against the straight edge of the construction material while guiding the marking device.

10. The construction material marking device of claim 1, wherein the marking material dispensed at predetermined intervals corresponds to fastener placement positions based on a predetermined measurement.

11. The construction material marking device of claim 1, wherein the marking material dispensed at predetermined intervals guides placement of fasteners into construction material.

12. The construction material marking device of claim 1, wherein the interrupted marking line corresponds to a centerline of a building stud.

13. The construction material marking device of claim 1, wherein the mark discharge assembly comprises:

a nozzle trigger member mounted to the marking arm, the nozzle trigger member structured to receive a nozzle of the marker held by the marker mount and to move between an activated position and an inactive position.

14. The construction material marking device of claim 13, wherein the mark discharge assembly comprises:

an actuator mounted to the marking arm, the actuator structured to move the nozzle trigger member from the activated position to the inactive position.

15. A construction material marking device comprising:

an edge rail that is straight and extends longitudinally to ride in contact with a straight edge of a construction material;

a marking arm that adjustably extends laterally from the edge rail which slidably receives the marking arm;

a marker mount disposed fixedly upon the marking arm at a distal end, the marker mount structured to hold a marker;

a roller mounted to the marking arm, wherein the roller rotates about an axis perpendicular to the edge rail;

a mark discharge assembly mechanically connected to the roller, wherein the mark discharge assembly comprises:

a slider-crank linkage comprising:

a connecting rod connected to the roller; and a trigger arm disposed distal to the connecting rod, wherein the trigger arm is operable to move past a first limit position, in a first direction, to engage the marker and move past the first limit position, in a second direction, to disengage the marker; and wherein the mark discharge assembly is configured to activate the marker held by the marker mount to dispense a marking material at predetermined intervals in an interrupted marking line that is laterally offset and parallel with the edge rail; and wherein positionally adjusting the marking arm perpendicular to the edge rail establishes a lateral offset of the marker mount.

16. The construction material marking device of claim 15, wherein the roller is a wheel having a circumference of between 2 inches to 12 inches and during rotation of the roller the marker is engaged between 0.25 inch to 1 inch of the circumference of the roller and disengaged over the remaining circumference of the roller.

* * * * *